United States Patent
Virag et al.

(10) Patent No.: US 7,131,135 B1
(45) Date of Patent: Oct. 31, 2006

(54) METHOD FOR AUTOMATICALLY DETERMINING THE CONFIGURATION OF A MULTI-INPUT VIDEO PROCESSING APPARATUS

(75) Inventors: David Emery Virag, Indianapolis, IN (US); Peter Paul Polit, Indianapolis, IN (US); Thomas Anthony Stahl, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/763,789

(22) PCT Filed: Aug. 26, 1999

(86) PCT No.: PCT/US99/19688

§ 371 (c)(1),
(2), (4) Date: Feb. 26, 2001

(87) PCT Pub. No.: WO00/13408

PCT Pub. Date: Mar. 9, 2000

Related U.S. Application Data

(60) Provisional application No. 60/097,916, filed on Aug. 26, 1998.

(51) Int. Cl.
*H04N 7/18* (2006.01)
*H04N 7/173* (2006.01)
*G06F 15/177* (2006.01)
*G06F 15/173* (2006.01)

(52) U.S. Cl. .................. 725/80; 725/107; 709/220; 709/222; 709/224; 713/1

(58) Field of Classification Search .................. 725/80, 725/15, 107; 709/220–224
See application file for complete search history.

(56) References Cited

U.S. PATENT DOCUMENTS 4,521,810 A    6/1985    Nigborowicz et al. ...... 358/181

(Continued)

FOREIGN PATENT DOCUMENTS

EP    0766462    4/1997

(Continued)

*Primary Examiner*—Chris Kelley
*Assistant Examiner*—Son P. Huynh
(74) *Attorney, Agent, or Firm*—Joseph J. Laks; Robert D. Shedd; Reitseng Lin

(57) ABSTRACT

A method for automatically defining or learning the configuration of a television interconnected with a plurality of peripheral devices utilizes a digital control channel to define the analog interconnections. This method does not require the consumer to know the specific configuration of the system. The system functions properly whether peripheral devices are in the video chain path or not. This method enables a suser to simply connect peripheral devices to any one of the multiple inputs of the video processing apparatus. The video processing apparatus employs a systematic process of (1) commanding each of said peripheral devices via a digital bus, such as an IEEE 1394 serial bus, to transmit a signal from its analog output, (2) monitoring the analog inputs of the video processing apparatus to determine which of the inputs receives the transmitted signal, and (3) constructing a map of the analog interconnectivity of each peripheral device connected to said video processing device.

12 Claims, 3 Drawing Sheets

U.S. PATENT DOCUMENTS

| | | | |
|---|---|---|---|
| 4,575,759 A | 3/1986 | Griepentrog et al. | 358/181 |
| 4,581,644 A | 4/1986 | Deiss | 358/181 |
| 4,581,645 A | 4/1986 | Beyers, Jr. | 358/181 |
| 4,776,038 A | 10/1988 | Testin et al. | 455/182 |
| 4,821,122 A | 4/1989 | Teskey | 358/181 |
| 4,996,597 A | 2/1991 | Duffield | 358/181 |
| 5,592,234 A | 1/1997 | Gardner et al. | 348/553 |
| 5,913,037 A * | 6/1999 | Spofford et al. | 709/226 |
| 6,003,041 A * | 12/1999 | Wugofski | 707/104.1 |
| 6,038,625 A * | 3/2000 | Ogino et al. | 710/104 |
| 6,453,364 B1 * | 9/2002 | Hara | 710/16 |
| 6,507,951 B1 * | 1/2003 | Wugofski | 725/59 |
| 6,529,680 B1 * | 3/2003 | Broberg | 386/83 |
| 6,591,419 B1 * | 7/2003 | Barry et al. | 725/25 |
| 6,675,383 B1 * | 1/2004 | Wheeler et al. | 725/19 |
| 6,731,347 B1 * | 5/2004 | Takano et al. | 348/558 |
| 2002/0016973 A1 * | 2/2002 | Matsushita et al. | 725/153 |
| 2004/0268415 A1 * | 12/2004 | Noda et al. | 725/134 |

FOREIGN PATENT DOCUMENTS

| | | |
|---|---|---|
| EP | 0843468 | 5/1998 |

\* cited by examiner

METHOD FOR AUTOMATICALLY DETERMINING THE CONFIGURATION OF A MULTI-INPUT VIDEO PROCESSING APPARATUS This application claims the benefit under 35 U.S.C. § 365 of International Application PCT/US99/19688, filed Aug. 26, 1999, which was published in accordance with PCT Article 21(2) on 9 Mar. 2000 in English, and which claims the benefit of U.S. Provisional Application Ser. No. 60/097,916, filed Aug. 26, 1998.

FIELD OF THE INVENTION

The invention relates to the field of auto-configuration of audio-video systems.

BACKGROUND OF THE INVENTION

Today, television receivers allow selection of external baseband audio and video signals from audio and video sources such as VCR's and videodisc players, as well as selection of broadcast television programs tuned and demodulated by a built-in tuner and intermediate frequency (IF) circuitry.

The external audio and video signals are coupled to individual input terminals (or jacks). These input terminals, and the output terminals of the internal tuner/IF circuitry, are coupled to the signal processing circuits of the television receiver via a signal switch assembly. One television receiver having multiple electronically selectable auxiliary baseband signal inputs is known from the RCA CTC-140 manufactured by Thomson Consumer Electronics, Inc., Indianapolis, Ind. This television receiver employs digital switching logic to automatically provide proper audio and video when each of the video source selections is made (i.e., tuner, AUX1 or AUX2).

U.S. Pat. No. 4,821,122 (Teskey) issued in 11 Apr. 1989 discloses a system in which in response to the reception of a "VCR ON" remote control command, a television receiver, to which the VCR is connected, automatically selects the AUX1 baseband video input as the signal source. If no signal is found at the AUX1 input, then the television receiver switches to the tuner, and tunes channel 3, and then channel 4 in succession, searching for input signals from the VCR. Thus, a user may select the VCR for viewing without knowing how the VCR was actually connected to the television receiver. However, suppose that a user has a baseband video signal source, other than the desired VCR, connected to AUX1. In this case, the automatic signal seeking function will not locate the VCR but will find an active signal at the AUX1 input, and thus will be "fooled" into selecting the signal at the AUX1 input.

U.S. Pat. No. 4,996,597 (Duffield) issued in 26 Feb. 1991 discloses a switching system which allows a user to specify which of several input connectors or channels is assigned to which of several signal sources, and store the connector or channel assignment data in memory. Thereafter, upon selection of a particular signal source, the system automatically selects the input connector or channel associated with the selected signal source in response to the stored data. The disclosed system also provides ease of use in that the television receiver automatically selects the proper input configuration when a signal source device is selected.

The emergence of high definition television (HDTV) will make available television programming services in a digital format using compressed digital video bitstreams. However, the complete transition to digital programming may take years or even decades. Thus multi-video service providers (MVSP) may likewise offer a combination of NTSC analog video programs and ATSC digital video programs. MVSPs may offer service to customers in multiple ways. First, to service customers with legacy analog television sets, a cable set-top box may include a digital MPEG decoder to convert digital signals to analog signals. In this case the consumer sees no difference in the way the system operates. Another implementation would be to provide a set-top box that offers the digital signals through a digital data bus and the analog programs through the traditional analog ports. This implementation lets the consumer take advantage of displaying the full resolution of the picture if they have a digital television.

'Dual-mode' systems have unique requirements in that a consumer may wish to switch between channels requiring a switch of the physical input ports on a television set or converter box. For a 'dual-mode' system to function properly, it is necessary for a television set to be knowledgeable about the particular configuration of the video source, display, and auxiliary devices.

In addition to the multiple signals produced by a single device such as a "dual mode" device, complex systems producing many signals may be created by interconnecting electronic devices such as television receivers, display devices, video-cassette recorders (VCR), digital versatile disk (DVD), direct broadcast satellite (DBS) receivers, and home control devices (e.g., a security system or a temperature control device) The interconnection may be done using a data bus such as the Consumer Electronics Bus (CE Bus), and the IEEE 1394 High Performance Serial Bus.

A bus protocol typically provides for communicating both control information and data. For example, CEBus control information is communicated on a "control channel" having a protocol defined in Electronics Industries Association (EIA) specification IS-60. On an IEEE 1394 serial bus, control information is generally passed using the serial bus' asynchronous services. Control information for a particular application can be defined using for example, CAL (Common Application Language) or AV/C.

Televisions and display devices typically have one or more inputs for gathering source signals for display. For example, a typical television may have an antennae input for tuning the broadcast RF television signals plus one or more auxiliary inputs for providing a higher quality base-band video and audio signal for display. One may use the antennae input for signals coming from a cable decoder box and use one set of auxiliary inputs for attaching a DVD or VCR player. Depending on the specific television product, multiple sets of auxiliary inputs may be available.

SUMMARY OF THE INVENTION

The present invention involves recognizing that as electronic systems increase in complexity as a result of interconnecting numerous devices, the likelihood greatly increases that a consumer will be confused regarding the interconnections of the system. For example, the user may become confused in how to access a signal from a particular device. This patent application defines a method for controlling a video processing apparatus (for example, a digital television) and peripherals such that the consumer is not obligated to know a specific configuration of the system. A digital control channel such as an IEEE 1394 serial bus is utilized to send commands to the peripheral device. In one embodiment of the present invention, the system functions properly whether peripheral devices are in the video chain path or not.

In accordance with one aspect of the present invention, a method for controlling a video processing apparatus interconnected to at least one peripheral device comprises commanding a peripheral device to transmit an analog signal from an analog output of said peripheral device. The video processing apparatus receives the analog signal from the peripheral device on one of the analog inputs of the video processing apparatus and determines which one of the analog inputs receives the analog signal. Finally, data associated with the analog input which receives the analog signal is stored in a memory device.

In accordance with another aspect of the present invention, a method for defining the interconnectivity of a plurality of peripheral devices to a plurality of analog inputs of a video processing apparatus is defined. The peripheral devices are also interconnected via a digital bus to the video processing apparatus. The video processing apparatus first selects one of the plurality of peripheral devices and then sends a command, via the digital bus, to the selected peripheral device. This command controls the selected peripheral device to transmit an analog signal from an analog output; the analog signal is received at one of the analog inputs of the selected peripheral device. Each of the analog inputs are monitored to determine which one receives the transmitted signal. This process is repeated for each of the other peripheral devices for automatically constructing a map of the analog interconnectivity of each peripheral device connected to the video processing apparatus.

In accordance with yet another aspect of the present invention, a method for configuring a video processing apparatus having an analog input and interconnected via a digital bus to at least two peripheral devices comprises sending a first command, via the digital bus, to the first peripheral device to switch the first peripheral device into passthrough operating mode. A second command is sent, via the digital bus, to the second peripheral device to transmit an analog signal from an analog output of the second peripheral device. The video processing apparatus receives the analog signal and monitors each of the analog inputs to determine which of the analog inputs receives the analog signal.

BRIEF DESCRIPTION OF THE DRAWINGS

The invention may be better understood by referring to the enclosed drawing in which.

Figure 1:
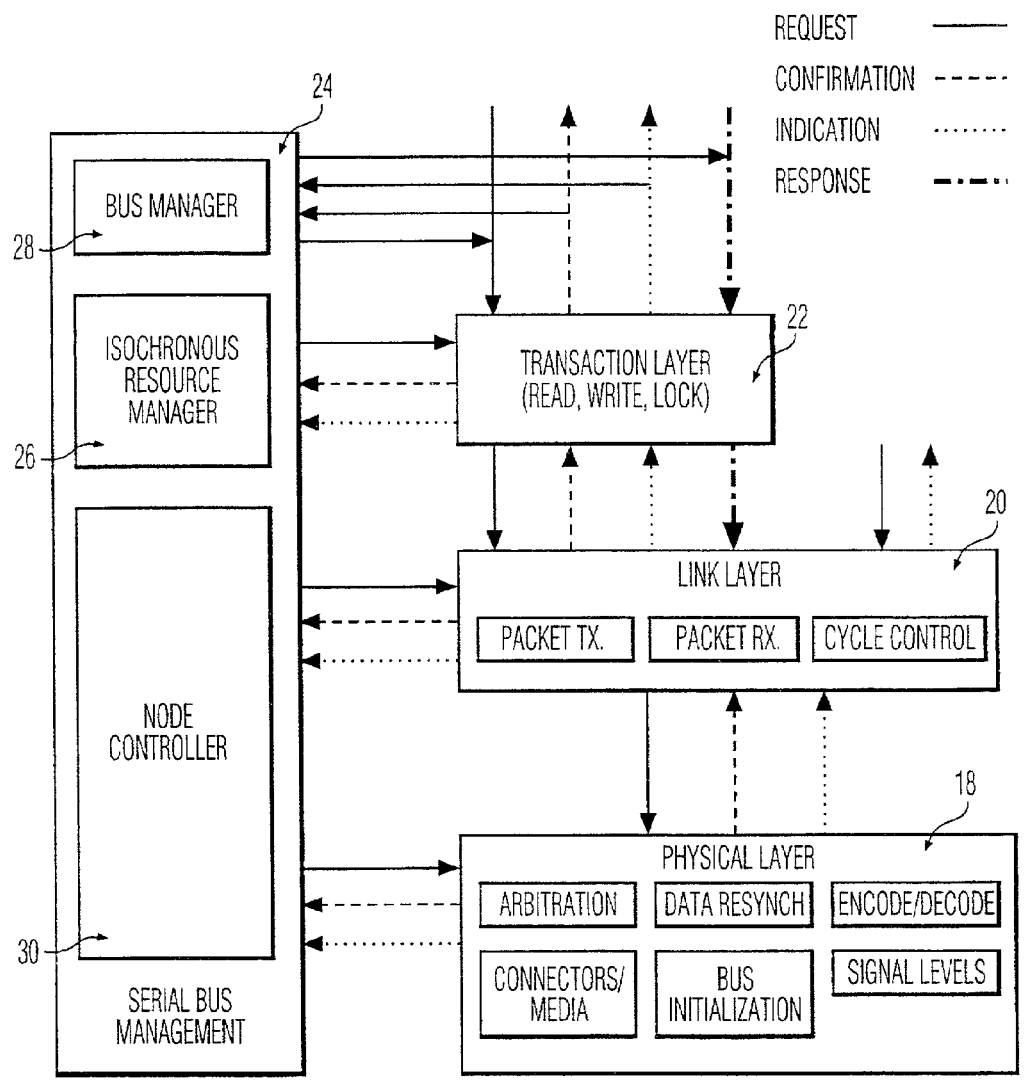
FIG. 1 is a simplified schematic block diagram illustrating the IEEE 1394 serial bus protocol.

In the drawings, reference designations that are identical in different figures indicate features that are the same or similar.

DETAILED DESCRIPTION OF THE DRAWINGS

The term "video processing apparatus" as used herein includes television receivers having a display device (commonly known as television sets), television receivers without a display device, such as set-top boxes (STB's), video cassette recorders (VCR), digital versatile disk (DVD), direct broadcast satellite (DBS) receivers. The term "television receiver" also includes television monitor/receivers having an RF tuner and baseband signal input circuitry. The term video cassette recorder or VCR also includes digital video cassette recorders or DVCRs.

The use of IEEE 1394 serial bus has been suggested for many applications within a Home Network environment. It is being discussed within Video Electronics Standards Association (VESA) for use as a "whole home network." It is being built into the next generation PCs and will be used for many local peripherals including disc drives. It is also clear that this will be an important interface for digital A/V consumer electronic devices such as digital televisions and VCRs. Within the entertainment cluster composed of consumer electronic audio/video devices, there are many different levels of interface support at the application level.

IEEE-1394 is a high speed, low cost digital serial bus developed for use as a peripheral or back-plane bus. Some of the highlights of the bus include: Dynamic node address assignments, Data rates of 100, 200, and 400 Mbits/sec, Asynchronous and isochronous modes, fair bus arbitration, and consistency with ISO/IEC 13213. FIG. 1 illustrates the serial bus protocol for the IEEE 1394 serial bus as a set of three stacked layers.

The physical layer 18 has physical signaling circuits and logic that are responsible for power-up initialization, arbitration, bus-reset sensing, and data signaling. Two shielded low-voltage differential signal pairs, plus a power pair are defined for the IEEE-1394 cable. Signaling is done by using Data-Strobe bit-level encoding which doubles jitter tolerance.

Data is formatted into packets in the link layer 20. Two classes of data communication between devices are supported: asynchronous and isochronous. Asynchronous communication can be characterized as "allows acknowledgment," while isochronous communication can be characterized as "always on time." The asynchronous service will be used primarily for control and status messages while isochronous communication will be used for data streams such as MPEG video. The timely nature of isochronous communication is achieved by providing a cycle every 125 µsec. Isochronous cycles take priority over asynchronous communication.

Asynchronous transfer can take place any time the bus is free. A minimum of 25 µsec out of every 125 µsec cycle is reserved for asynchronous data transfer isochronous transfer provides a real-time data transfer mechanism. An ongoing isochronous communication between one or more devices is referred to as a channel. The channel has to be established first, and then the requesting device is guaranteed to have the requested amount of bus time every cycle.

The transaction layer 22 defines a complete request-reply protocol to perform bus transactions. Although transaction layer 22 does not add any services for isochronous data transfer, it does provide a path for management of the resources needed for isochronous services. This is done through reads and writes to the control status register (CSR). Transaction layer 22 also defines a retry mechanism to handle situations where resources are busy and unable to respond. Asynchronous data is transferred between IEEE-1394 nodes utilizing one of three transactions; "read-data" for retrieving data from a different node, "write-data" for transferring data to a different node and "lock-data" for transferring data to a different node for processing and then the data is returned back to the original node.

Serial bus management 24 describes the protocols, services, and operating procedures whereby one node is selected and may then exercise management level control over the operation of the remaining nodes on the bus. There are two management entities defined for IEEE 1394 serial bus; the isochronous resource manager 26 and the bus manager 28. These two entities may reside on two different nodes or on the same node. Bus manager 28 may be absent from the bus. In this circumstance, the isochronous resource manager 26 exercises a subset of the management responsibilities normally assumed by the bus manager 28. The bus manager 28 provides a number of services including; maintenance of the speed and topological map, and bus optimization. The isochronous resource manager provides facilities for allocation of isochronous bandwidth, allocation of channel numbers, and the selection of the cycle master.

Node control is required at all nodes; node controller 30 implements the CSRs required by all serial bus nodes and communicates with the physical 18. link 20, and transaction 22 layers and any application present in the device. Node controller 30 component as well as CSR and configuration ROM facilities are used to configure and manage the activities at an individual node.

For the IEEE 1394 serial bus to function properly, an Isochronous Resource Manager (IRM) 26 and a Bus Manager (BM) 28 will be needed. Since most clusters will include a display device of some kind, it should be required that the DTV be IRM and BM capable.

The IRM 26 provides the resources necessary for the serial bus to cooperatively allocate and de-allocate the isochronous resources, (channels and bandwidth) required for orderly isochronous operations. The IRM 26 provides a common location for the other nodes to check on availability of channels and bandwidth, and to register their new allocations. The IRM 26, whose location is known immediately upon completion of the self identify process, also provides a common location where serial bus nodes may determine the identity of the BM 28, if one is present.

The BM 28, if present, provides management services to other nodes on the serial bus. These include activation of a cycle master, performance optimization, power management, speed management and topology management.

Functional Control Protocol (FCP) is designed in order to control devices connected through an IEEE-1394 bus. FCP uses the IEEE-1394 asynchronous write packet for sending commands and responses. The IEEE-1394 asynchronous packet structure with FCP imbedded in the data field shown below. The Command/Transaction SET (CTS) specifies the command set (e.g. AV/C, CAL).

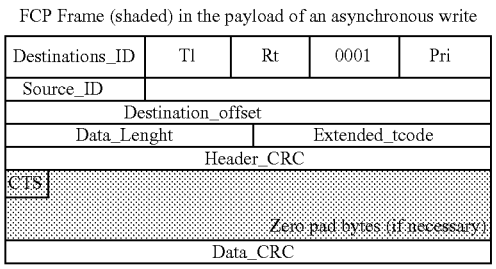

FCP Frame (shaded) in the payload of an asynchronous write

| Destinations_ID | T1 | Rt | 0001 | Pri |
|---|---|---|---|---|
| Source_ID | | | | |
| Destination_offset | | | | |
| Data_Lenght | | | Extended_tcode | |
| Header_CRC | | | | |
| CTS | | | | |
| | | | Zero pad bytes (if necessary) | |
| Data_CRC | | | | |

FCP frames are classified as command frames, and response frames. The command frame is written into a command register on a peripheral device and the response frame is written into a response register on a controller. The standard specifies two addresses for the command and the response.

Application Control Languages

In order for a consumer electronic device to interact with other devices interconnected via an IEEE 1394 serial bus, a common product mode and common set of commands must be defined. Presently, three standards exist for device modeling and control: CAL, AV/C and the approach adopted for the USB.

CAL and AV/C are control languages that distinguish between logical and physical entities. For example, a television (i.e., a physical entity) may have a number of functional components (i.e., logical entities) such as a tuner, audio amplifier, etc. Such control languages provide two main functions: Resource allocation and Control. Resource allocation is concerned with requesting, using and releasing Generic Network resources. Messages and control are transported by the FCP as defined in IEC-61883 and discussed above. For example, CAL has adopted an object base methodology for its command syntax. An object contains and has sole access to a set number of internal values known as instance variables (IV). Each object keeps an internal list of methods. A method is an action that an object takes as a result of receiving a message. When a method is invoked, one or more IVs are usually updated. A message consists of a method identifier followed by zero or more parameters. When an object receives a method, it looks through its list of methods for one, which matches the method identified in the message. If found, the method will be executed. The parameters supplied with the message determine the exact execution of the method.

The design of control languages is based on the assumption that all consumer electronic products have a hierarchical structure of common parts or functions. For example, CAL treats each product as a collection of one or more of these common parts called Contexts. These contexts are designed to allow access to product functionality in a uniform way. The context data structure is a software model defined in each device that models the operation of all device functions.

A context consists of one or more objects grouped together to form a specific functional sub-unit of a device. Like an object, context is a model of a functional sub-unit. Devices are defined by one or more contexts. CAL has defined a large set of contexts to model various types of consumer electronic devices. Each context, regardless of what product it is in, operates the same way.

The interaction between a controller (e.g., digital television) and target or peripheral device (e.g., digital VCR) can mainly be divided into two major categories:

i) A machine—machine interaction where both controller and peripheral device are machines. It is important to note that for this type of interaction, there is no user initiation at the time of the actual interaction. However, it is possible that the user preprogrammed the controller to carry a specific action at a specific point in time.

ii) A user-machine interaction where a human is initiating actions on the controller.

The discovery process allows the controlling device to discover other devices in the network. This process is activated by a bus reset and serves to search and discover existing devices on the network. A bus reset may be caused by connecting/disconnecting a device, software initiated reset etc. This software module relies on some information stored on each device configuration ROM. This information is referred to as Self Description Device (SDD) and contains information such as Model #, Location of menu, URL, EUI Vendor ID etc.

The SDDT of a Display/Controller contains a pointer to an information block, which contains information about the display capabilities of the device. The information block may include; type of display (interlaced or progressive), maximum bytes per line, true color capability, resolution modes supported (full, ½, ⅓), maximum bits/pixel supported for palette mode (2, 4, 8), etc. Other methods of discovery can also be used to obtain this information, such as the Home Plug and Play as defined for CAL or the subunit descriptors defined for AV/C.

After the bus initialization is complete, the discovery manager reads the SDD information located in the ROM of each connected device. This information will be built into a registry table.

Each device on the IEEE 1394 serial bus will have a registry table, which will be used to keep track of other devices on the bus and their capabilities. For all devices on the bus, this device registry (registry table) will be constantly updated in the discovery process on bus resets. The Registry provides services to the application for mapping volatile characteristics like IEEE 1394 node_ID, IP address etc. to a non-volatile identification scheme used by the application. The application uses the non-volatile 64-bit EUI (Extended Unique Identifier) for identifying any node on IEEE 1394 serial bus. The services of Registry are used to map this 64-bit EUI to volatile IEEE 1394 node_ID or IP.

The "Registry" module is a system service module. The "Registry" system module allows the communication between the nodes within the home network by abstracting their location inside the home network.

The registry table is maintained by the Registry manager within each device and contains the information for each node to provide the service previously specified. This registry table is constantly updated by the Discovery manager on bus resets. Each row of the Registry Table can be as follows:

| 64-bit EUI | 1394 node_ID | IP address | Manufac/Model# | Device Type |
|---|---|---|---|---|

The fields of the registry table are defined as:
  64-bit EUI is a 64-bit number that uniquely identifies a node among all the Serial Bus nodes manufactured world-wide.

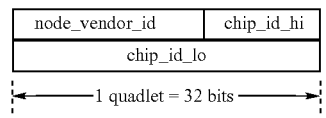

1394 node_ID is a 16-bit number that uniquely identifies a Serial Bus node within a 1394 subnet. The most significant 10 bits are the bus ID and the least significant bits are the physical ID. Bus ID uniquely identifies a particular bus within a group of bridged buses. Physical ID is dynamically assigned during the self-identification process.
  IP address is a 32-bit private IP address assigned dynamically.
  Manufacturer/Model # is obtained from the device's SDDT and is used to inform the customer of possibilities for selecting a source.
  Device Type is also obtained from the device's SDDT and is used to inform the customer of possibilities for selecting a source. This field may also be useful in determining what stream format should be used. For example, a game machine may not use MPEG 2 as an output format.

The application can use the registry to determine the IEEE 1394 address for any node on the home network based on the 64-bit EUI of that node. The registry will be built during the discovery process after a bus reset. Correlation to a stable identifier such as the EUI is important since node addresses can change during a bus reset.

As described above in more detail, typical digital 'bus' type systems include a communication channel and control channel in which any device may 'talk' with any other device within the local network. Such a discovery process can successfully be used to determine the configuration of the devices that are connected to the IEEE 1394 serial bus, which define the entertainment cluster. (Particularly as described above, the IEEE 1394 serial bus has a mechanism at power-up in which all devices and their general capabilities are announced to the other devices on the bus.) A television receiver with a digital input (or a digital television) or a set-top decoder box with a digital input acting as a television receiver can determine the type and capabilities of other devices on the local network. At start-up, a television may know that a DVCR and digital cable decoder box are present in the network. A television, however, does not know how or where any of the analog signals output from the peripheral devices are routed in the configuration (i.e., the configuration of the analog signal paths between the peripheral device and the digital television). For example, a DVCR may have its analog output connected to either the auxiliary 1 (Aux 1) or auxiliary 2 (Aux 2) inputs of the television. If the DVCR was aware of which television input port its output was plugged into it could relay this information to the televsion through a digital bus command. Unfortunately the DVCR does not have this information available.

Figure 2:
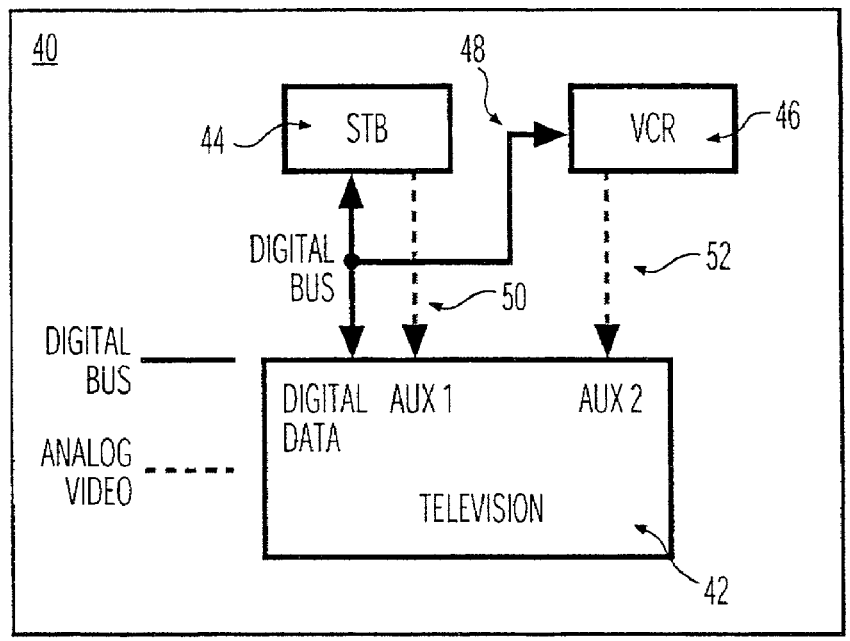
FIG. 2 is a block diagram of an entertainment cluster employing one aspect of the present invention.

A problem with the above-scenario is highlighted by the fact that a television may have several inputs for selecting source material. FIG. 2 is a block diagram of an entertainment cluster 40 including a digital television (DTV) 42, a set-top box (STB) 44 and a digital video cassette recorder (DVCR) 46. Digital bus 48, for example an IEEE 1394 serial bus, is used to interconnect the three devices (i.e., DTV 42, STB 44 and DVCR 46) together. In addition to its digital interface, STB 44 also has an analog output. The analog output of STB 44 is connected to one of the analog inputs (for example, AUX1) of DTV 42 via an analog cable 50. Similarly, DVCR 46 also has an analog output which is also connected to one of the analog inputs (for example, AUX 2) of DTV 42 via a separate analog cable 52.

Thus, if DTV 42 could automatically be switched from a digital input to an analog input without user intervention, the television must know the specific analog input (either AUX1 or AUX2) associated with the present digital input stream. That is, if digital set-top box 44 is plugged in such that its digital stream inputs through the digital input port of DTV 42 and its analog content is provided through the AUX 1 input of DTV 42, the television must know this information to properly make the switch. A user is then obligated to set-up and configure the television and cable decoder box with this configuration in mind. If the consumer inadvertently connected the analog cable output into the AUX 2 input or antennae input (not shown), the system would not function correctly.

Therefore, the digital communications link (i.e., an IEEE 1394 serial bus) may be utilized by the digital television to assist in automatically determining the configuration of the system. Using a small command set (an exemplary set of such functional pseudo code is defined below in connection with FIG. 4), the DTV may command the digital decoder box to output a known pattern on its analog output. The television can then scan all of its available analog inputs and automatically determine which analog port this device is connected to. For example, a video blanking signal could be used for a pre-determined video test signal. The television commands the digital decoder to output an analog video blanking signal and then begins searching for this input signal on all of its various analog inputs, including the modulated RF tuner input. The television can then systematically step through every device on the digital network using this algorithm and build an internal map of the analog signal configuration of the system.

If the configuration is direct, i.e. the digital cable decoder box connected directly to the digital and analog inputs of a television set, the television may simply select its display source from the analog plug and no consumer interaction is required. However, an anomaly may arise if the consumer is viewing a digital signal and wants to switch to an analog signal. Particularly, in the case where a digital cable decoder analog output is routed through a box such as a DVCR (i.e., an indirect connection) instead of routing directly into a television set input. The transition from the digital input to analog input may require the user to actively switch the DVCR into a passthrough mode to view the analog content of the cable decoder box. Therefore, the consumer must be aware of the configuration and take an active role in making the system perform properly; this may be an undesirable solution.

If the DVCR is in passthrough mode, the signal would appear at the DVCR analog input to the television rather than a separate cable input to the television. Alternatively, if the DVCR is not in passthrough mode, the analog signal will not appear at the television input. Because the DVCR is also on the digital control bus, the DVCR will respond a 'passthrough' command, which would automatically configure the DVCR to pass the input signal through unmodified. The television could use a variety of algorithms to determine if the digital cable decoder box and DVCR are in the same analog video chain. Once this information is known, the television may then use this information in conjunction with the DVCR passthrough command to automatically and without user intervention switch from a digital video signal to an analog video signal for dual-mode services being provided from a digital cable decoder box.

Figure 3:
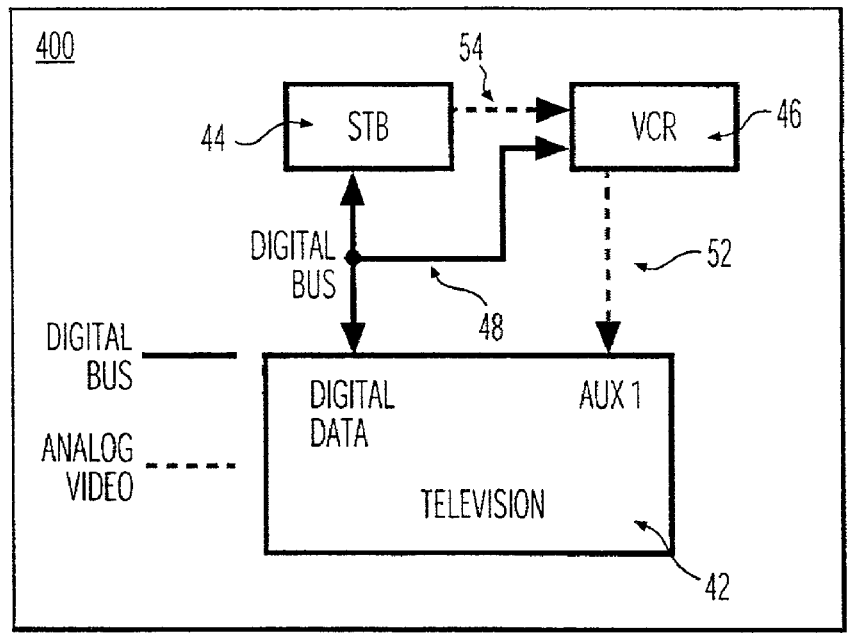
FIG. 3 is a block diagram of an entertainment cluster employing another aspect of the present invention.

FIG. 3 is a block diagram of an entertainment cluster 400 having a digital television (DTV) 42, a set-top box (STB) 44 and a digital video cassette recorder (DVCR) 46. Digital bus 48 is employed to interconnect the three devices together. STB 44 is also connected to an analog input of DVCR 46 via an analog connection 54. DVCR 46 is also connected to an analog input (AUX 2) of DTV 42 via an analog connection 52. Therefore, the analog output of STB 44 is passed through DVCR 46 to DTV 42.

Figure 4:
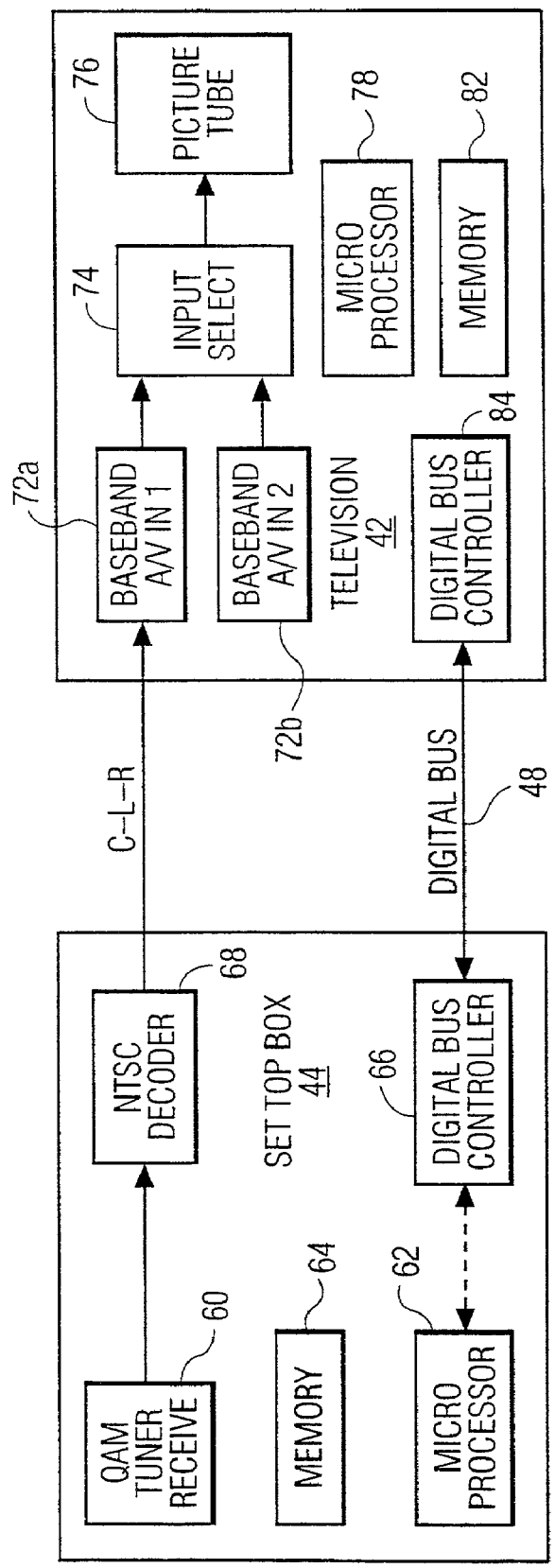
FIG. 4 is a detailed functional block diagram of a digital television and a set-top box in accordance with the present invention.

FIG. 4 is a functional block diagram of a digital television (DTV) 42 and a set-top box (STB) 44, which may be helpful in defining the present invention. STB 44 may comprise a tuner/receiver module 60 which demodulates the signal of interest, a microprocessor 62 and memory 64 which provides for the main control and coordination of resources within the box, a digital bus controller 66 which manages how data is transmitted or received to or from other devices, and an NTSC encoder 68 with video mixer which provides the capabilities to overlay on-screen displays. Analog video signals are tuned and demodulated and decomposed into composite video and left-right audio in the tuner/demodulator. Digital audio-video signals may be passed directly to the serial bus for decoding in the digital television. The analog audio-video output of the set-top box consists of composite video with left and right audio signals (C-L-R).

DTV 42 may comprise a set of one or more baseband audio/video inputs 72a and 72b including a grouped collection of composite video and left and right audio signals. Typically these are color coded physically located to infer a logical grouping of signals. Many television sets have more than one grouping as demonstrated in the diagram. These multiple input groups are routed to an input selector 74. The input selector will choose the particular input grouping for displaying on the picture tube 76 and audio speakers (not shown). DTV 42 also consists of a microprocessor 78 and memory 82 for the purposes of controlling the hardware resources within the television set and a digital bus controller 84 for interconnection with other devices.

DTV 42 may be used as a master controller for automatically configuring the installation of the set-top box with the television set. When STB 44 and DTV 42 are first mated DTV 42 will not be capable of determining at which analog input it should look for a video signal. A simple process can be completed such that the television sends a command via the digital bus 48 to the set-top box to exercise its output with a predetermined video signal. This signal may be a blanking signal, black level, color bars or any other signal that may be generated by a standard NTSC encoder IC. The set-top box initiates the signal, which is output on the video, cables which are plugged into one of the video input sockets on the television set. The television set microprocessor may then scan the various video input ports in search of the predetermined video pattern. Once found, the television has knowledge of which port the set-top box has been connected and records this in memory for future use. A sample script of actions follows:

| | |
|---|---|
| Television: | Serial Bus command: Enable_Video_Test_Pattern |
| Set-top Box: | Microprocessor establishes a video test signal on output. |
| Television: | Scan for signal among video input ports. |
| Television: | If video signal found - record port in memory. |
| Television: | If video signal not found - issue error message to user to check cables. |
| Television: | Serial Bus command: Disable_Video_Test_Pattern |
| Set-top Box: | Microprocessor clears video test signal and returns to normal mode. |

It should be noted that the above invention has no requirement to use video signals. Because logical groupings of video and audio signals exist, an audio signal may be substituted for the video signal in the procedure as the signal that is set and tested for. Likewise, the composite-left-right audio/video signals may be substituted by other standard audio/video signals including modulated carriers over coaxial cable.

Other variations are also possible. For example a simple ON-OFF-ON-OFF flashing pattern may be used to delineate the video output on the device in test from the video output of other potential devices. This may have the advantage that any video signal may be used in the test of input ports. It should also be noted that the controlling device need not be a television. For example, common audio-video (A/V) amplifiers act as an accumulator of signals switching a single output to a end television. In this case, the A/V amplifier may act as the controller for auto-configuration of its input ports. In yet another implementation the sourcing device, for example the STB noted above, may have multiple outputs of independent video. In this case, each independent video output may be routed to a specific input port on a receiving device effectively configuring a array of video inputs and outputs.

While the invention has been described in detail with respect to numerous embodiments thereof, it will be apparent that upon a reading and understanding of the foregoing, numerous alterations to the described embodiment will occur to those skilled in the art and it is intended to include such alterations within the scope of the appended claims. For example, the present invention may be extended to audio peripheral devices and home control devices.

What is claimed is:

1. A method for controlling a video processing apparatus, the method comprising:
   (a) sending a message via a digital bus interconnecting a peripheral device and said video processing apparatus, said message causing said peripheral device to transmit a test signal pattern from an analog output of said peripheral device;
   (b) receiving said test signal pattern from said peripheral device on one of a plurality of analog inputs of said video processing apparatus, wherein said video processing apparatus distinguishes said test signal pattern from other signals received on said analog inputs;
   (c) enabling said video processing apparatus to determine which one of said plurality of analog inputs receives said test signal pattern; and
   (d) storing data, in said video processing apparatus, associated with said analog input which has received said test signal pattern.

2. The method of claim 1 wherein the step of enabling comprises repetitively selecting each one of said analog inputs of said video processing apparatus to determine which one of said analog inputs receives said test signal pattern.

3. The method of claim 2 wherein more than one peripheral device is connected to said video processing apparatus and the steps of sending, receiving, enabling and storing are repeated for each one of said peripheral devices.

4. The method of claim 3 further comprising a step of constructing a map of the analog interconnectivity between each said peripheral device and said video processing device.

5. The method of claim 2 wherein said test signal pattern is an analog video blanking signal.

6. The method of claim 1 wherein said video processing apparatus is a digital television.

7. The method of claim 1 wherein said video processing apparatus is a digital set-top box.

8. The method of claim 1 wherein said digital bus is an IEEE 1394 data bus.

9. A method for defining the interconnectivity of a plurality of peripheral devices to a plurality of analog inputs of a video processing apparatus, said peripheral devices also being interconnected via a digital bus to said video processing apparatus, said video processing apparatus performing the steps of:
   (a) selecting one of said plurality of peripheral devices;
   (b) sending a command, via said digital bus, to said selected peripheral device for commanding said selected peripheral device to transmit a test signal pattern from an analog output of said selected peripheral device;
   (c) receiving said test signal pattern from said selected peripheral device on one of said analog inputs of said video processing apparatus, wherein said video processing apparatus distinguishes said test signal pattern from other signals received on said analog inputs;
   (d) monitoring each of said plurality of analog inputs to determine which of said plurality of analog inputs receives said test signal pattern; and
   (e) repeating steps (a), (b), (c) and (d) for each of the other ones of said plurality of peripheral devices for automatically constructing a map of the analog interconnectivity of each said peripheral device connected to said video processing apparatus.

10. The method of claim 9 wherein said digital bus is an IEEE 1394 serial data bus.

11. A method for configuring a video processing apparatus having a plurality of analog inputs and being interconnected via a digital bus to at least first and second peripheral devices, said method comprising:
   (a) sending a first command, via said digital bus, to said first peripheral device to switch said first peripheral device into a pass through operating mode;
   (b) sending a second command, via said digital bus, to said second peripheral device to transmit a test signal pattern from an analog output of said second peripheral device;
   (c) receiving said test signal pattern from said second peripheral device on one of said analog inputs of said video processing apparatus, wherein said video processing apparatus distinguishes said test signal pattern from other signals received on said analog inputs; and
   (d) monitoring each of said analog inputs to determine which one of said analog inputs receives said test signal pattern.

12. The method of claim 11 wherein said digital bus is an IEEE 1394 serial data bus.

* * * * *